US009809326B2

(12) United States Patent
Haserodt

(10) Patent No.: US 9,809,326 B2
(45) Date of Patent: Nov. 7, 2017

(54) METHOD FOR ADJUSTING THE PLAY IN A HIGH-LIFT SYSTEM OF AN AIRCRAFT

(71) Applicant: Airbus Operations GmbH, Hamburg (DE)

(72) Inventor: Jan Haserodt, Hamburg (DE)

(73) Assignee: Airbus Operations GmbH (DE)

(*) Notice: Subject to any disclaimer, the term of this patent is extended or adjusted under 35 U.S.C. 154(b) by 105 days.

(21) Appl. No.: 15/009,242

(22) Filed: Jan. 28, 2016

(65) Prior Publication Data
US 2016/0221694 A1  Aug. 4, 2016

(30) Foreign Application Priority Data
Jan. 29, 2015 (DE) .................... 10 2015 101 336

(51) Int. Cl.
*B64F 5/00* (2017.01)
*F16D 43/02* (2006.01)
*B64C 13/28* (2006.01)
*B64C 13/34* (2006.01)
*B64C 9/14* (2006.01)
(Continued)

(52) U.S. Cl.
CPC .............. *B64F 5/0081* (2013.01); *B64C 9/14* (2013.01); *B64C 13/00* (2013.01); *B64C 13/28* (2013.01); *B64C 13/34* (2013.01); *B64F 5/40* (2017.01); *F16D 43/02* (2013.01); *B64D 2045/001* (2013.01)

(58) Field of Classification Search
CPC .......... B64C 13/28; B64C 9/14; B64C 13/00; B64C 13/34; F16D 43/02; B64F 5/40; B64D 2045/001
See application file for complete search history.

(56) References Cited

U.S. PATENT DOCUMENTS 4,786,013 A * 11/1988 Pohl .................... B64C 13/28
                                                    244/213
6,224,017 B1 * 5/2001 Fischer ................. B64C 13/28
                                                    188/134
(Continued)

FOREIGN PATENT DOCUMENTS

EP          2 801 520 A1    11/2014

OTHER PUBLICATIONS

EP Search Report Jun. 17, 2016.

*Primary Examiner* — Ryan J Walters
(74) *Attorney, Agent, or Firm* — Lerner, David, Littenberg, Krumholz & Mentlik, LLP

(57) ABSTRACT

A method for adjusting play in a high-lift system of an aircraft with several flaps, moved by a drive unit with the aid of driving stations connected to a driveshaft, includes disengaging the mechanical connections between the driveshaft and the driving stations in the first position, displacing the individual drive levers by mechanically driving a gear input of the associated rotary actuator such that the individual drive levers come into mechanical contact with a stop in a second position, spaced apart from the first position, and are pretensioned by a certain torque, rotationally fixing the gear inputs of the rotary actuators, adapting the length of connecting links between the respective drive levers and a support arm carrying the associated flap such that a position of the associated flap corresponding to the position of the stop is reached, and reconnecting the driving stations to the driveshaft pretensioned to have no play.

6 Claims, 2 Drawing Sheets

(51) Int. Cl.
*B64C 13/00* (2006.01)
*B64F 5/40* (2017.01)
*B64D 45/00* (2006.01)

(56) References Cited

U.S. PATENT DOCUMENTS

| | | |
|---|---|---|
| 2013/0181089 A1 | 7/2013 | Recksiek et al. |
| 2014/0336891 A1* | 11/2014 | Heintjes ................ F16D 43/02 701/68 |

* cited by examiner

METHOD FOR ADJUSTING THE PLAY IN A HIGH-LIFT SYSTEM OF AN AIRCRAFT

FIELD OF THE INVENTION

The invention relates to a method for adjusting the play in a high-lift system of an aircraft.

BACKGROUND OF THE INVENTION

A high-lift system of an aircraft is used for purposefully increasing the lift of the aircraft, particularly during take-off and landing, and to thereby reduce the inflow velocity against the lifting surfaces required for the take-off and for the flight. Many different types of high-lift systems, which comprise extendable high-lift surfaces on leading and/or trailing wing edges, are known from practical applications. In addition, different techniques are used for moving high-lift surfaces, wherein the concept of a central drive unit and rotating driveshafts, which are driven by said drive unit and extend into the wing halves, is widely used. Driving stations are mechanically connected to the driveshaft and convert a rotation into a motion of the associated flap. In addition to linear spindle-based devices, devices with multi-link chains moved by a rotating drive lever are also used for this purpose.

In the manufacture of an aircraft, subassemblies responsible for a motion of components are always adjusted individually such that predefined functions and motion paths may be exactly realized. In high-lift systems that are based on a central drive unit, in particular, it may be expected that certain play may occur along the kinematic chain between the drive unit and the driven point of a flap. Mechanical play may be expected, in particular, in a "dropped-hinge" design, in which a rotary actuator driven by the driveshaft moves a drive lever that is pivotably coupled to a flap, which is likewise mounted in a pivotable fashion. This may manifest itself in that the flap in question is constantly pressed in the direction of a retracted position while the aircraft is airborne due to the lifting forces occurring on the flap.

SUMMARY OF THE INVENTION

An aspect of the invention therefore may be seen in proposing a method for adjusting the play in a high-lift system of an aircraft, by means of which the play may either be completely eliminated or adapted during the adjustment of the high-lift system in such a way that the play does not have to be compensated by adapting the motion of the flaps.

An aspect of the invention proposes a method for adjusting the play in a high-lift system of an aircraft, in which the high-lift system comprises a drive unit, a driveshaft that is connected to the drive unit and several driving stations that are distributed along and mechanically connected to the driveshaft and respectively comprise a rotary actuator with a housing and a drive lever mounted therein, wherein said drive lever extends radially from a rotational axis of the rotary actuator and is coupled to a pivotably mounted flap by means of a connecting link, and wherein the respective drive levers are moved by rotating the driveshaft with the aid of the drive unit and the flaps are thereby displaced between a retracted and an extended position. The method comprises the steps of displacing the driving stations into a first position, disengaging the mechanical connections between the driveshaft and the driving stations in the first position, displacing the individual drive levers in the direction of an extended position by mechanically driving a gear input of the associated rotary actuator such that the individual drive levers come into mechanical contact with a stop in a second position, which is spaced apart from the first position in the extending direction, rotationally fixing the gear inputs of the rotary actuators, adapting the length of the connecting links in such a way that a position of the associated flap corresponding to the position of the stop is reached, and reconnecting the driving stations to the driveshaft.

The housing does not necessarily have to be a housing of the rotary actuator, but may also consist of the housing of a mounting device for the drive lever that may be mechanically connected to the rotary actuator.

Although the play may not be eliminated with the method according to the invention, the play is shifted to the same side of an actuating direction for all driving stations. The design of the high-lift system, on which the method is based, refers to a so-called "dropped-hinge" system, in which a trailing edge flap is pivotably mounted on a hinge by means of a support arm and assumes a position that depends on the position of the drive lever. After the method has been carried out, certain play may exist between the flaps and a front stop in a retracted position such that the flaps may due to their own weight not be in the completely retracted position while the airplane is on the ground, but rather extended by a few millimeters. However, as soon as the aircraft moves and a corresponding inflow occurs, the corresponding flaps develop a lifting force, which due to the play results in the flaps moving flushly into the completely retracted position. The key features of the method are once again explained below.

The drive unit may be realized in the form of a central drive unit ("power control unit" or PCU) in a root region of a wing or in the form of several local drive units in a respective wing, in which case a driveshaft extends from these local drive units in the direction of the respective wing tip. The routing of the driveshaft in the wings, as well as the mechanical coupling between the driving stations and the driveshaft, is irrelevant in this context. Many different options that allow the transmission of mechanical power from the driveshaft into the driving stations may be considered for this purpose.

A rotary actuator may comprise an angle gear and/or a reduction gear such that the drive lever may be moved between two extreme positions in dependence on the rotation of the driveshaft and therefore of a gear input of the rotary actuator. A rotary actuator of this type is frequently referred to as "geared rotary actuator" (GRA). The drive lever may be mounted on or in the rotary actuator. The device for mounting the drive lever on the housing is frequently referred to as "lever bearing assembly" (LBA). The drive lever is coupled to a gear output of the rotary actuator.

The position of a flap of the high-lift system depends on the design of the flap mounting and, in particular, the spatial position of the flap hinge. The hinge is preferably located underneath the respective flap and slightly offset forward, i.e. in the direction of flight and along a longitudinal aircraft axis. This arrangement is referred to as a "dropped-hinge" design. The flap is pivoted about its hinge by the support arm by moving the driveshaft and thereby the rotary actuator and the drive lever and in this way adjusted into any position between a retracted position and a maximally extended position.

Before the method begins, all driving stations should be displaced into a first and preferably retracted position by rotating the driveshaft. This is initiated, for example, due to the transfer of a corresponding signal to a slat flap control computer, which receives feedback on the current position of the flaps from corresponding sensors on the drive unit and on the driving stations when the driveshaft is in motion.

In this first position, the mechanical connections between the driveshaft and the driving stations are disengaged. The now released driving stations may under certain circumstances be realized in a self-locking fashion, but such a design is not common practice. It may therefore be sensible to choose the first position in such a way that it is not spaced apart too far from the second position and the corresponding driving stations respectively slide or are turned over only a short distance.

The stop in the second position, which is spaced apart from the first position in the extending direction, may hold the drive lever in the second position due to the mechanical contact therewith. The drive lever flushly abuts on the stop by driving each rotary actuator due to the input of a torque at the respective gear input of the corresponding rotary actuator such that the rotary actuator tensions itself on the stop and any play in this direction may be precluded. The respective gear input simultaneously has to be rotationally or torsionally fixed such that the corresponding rotary actuator does not once again return into an untensioned state, in which the precise position of the drive lever is lost. It is possible to realize the drive of the corresponding rotary actuator with a separate tool that comprises a ratchet mechanism and remains fixed on the corresponding rotary actuator while the method according to the invention is carried out.

The corresponding driving station ultimately is exactly adjusted with a subsequent adjustment of the flap position realized by adapting the length of the connecting link between the drive lever and the support arm of the flap accordingly such that an exactly predefined position of all driving stations is reached during a displacement motion of the driveshaft. The high-lift system is operational after connecting the driving stations to the driveshaft, wherein the play in the drivetrain also has to be shifted in the direction of the retracted position prior to producing the connection. Before the connection is once again produced, the corresponding driveshaft or transmission shaft should be turned so far in the extending direction (depending on the type of connection over part of one revolution of the transmission) until the connection may be once again engaged. In comparison with the play in the rotary actuator and in a connection between the rotary actuator and the device for mounting the drive lever, however, the effects of this play on the flap position are lower by several orders of magnitude due to the usually quite high reduction ratio of the rotary actuator.

An advantageous embodiment furthermore comprises the arrangement of removable stops on the individual housings in the second position and the removal of all stops after the adaptation of the length of the connecting links, wherein the rotary actuators are for this purpose shifted in the direction of the retracted position at least to a certain extent after the adjustment of the length of the connecting links and the connection of the driveshafts or transmission shafts. The positions of the removable stops are random and may be chosen in accordance with the respective requirements or in dependence on special characteristics of the kinematic chain between drive lever and flap. It merely has to be observed that the stop is arranged in such a way that a motion of the drive lever in the extending direction is blocked.

Alternatively, an already existing end stop may also be used as stop, wherein the second position corresponds to the completely extended position in this case. It is therefore not necessary to move the flaps into a completely retracted position for the beginning of the method.

If a removable stop is used, the second position may be a 0°-position that corresponds to the completely retracted position. This position is also referred to as "clean" configuration for the cruising mode. It would technically also be possible to move the flaps into a position of −1°. Prior to the arrangement of the stop, the flaps therefore have to be retracted to such a degree that the stop may be mounted and comes in contact during the extension into the flap position to be adjusted. In this way, the stop may be precisely aligned and the utilization of predefined fixed gear points makes it possible to use an adjusting aid in the form of an adjusting rod with a predefined fixed length, which respectively fits or may be installed between the predefined gear points only when the flap position is correctly adjusted. The adjustment effort for a high-lift system with several driving stations may thereby be significantly reduced.

The displacement of the individual drive levers may furthermore include the arrangement of a rotary device with ratchet mechanism on the gear input of the rotary actuator. This rotary device may be temporarily fixed on the housing, as well as temporarily attached to the rotary input only.

The method is suitable for use in connection with many different high-lift systems. However, it is particularly advantageous for a high-lift system with a dropped-hinge design of the flap mounting.

BRIEF DESCRIPTION OF THE FIGURES

Other characteristics, advantages and potential applications of the present invention result from the following description of exemplary embodiments and the figures. In this respect, all described and/or graphically illustrated characteristics form the object of the invention individually and in arbitrary combination regardless of their composition in the individual claims or their references to other claims. Furthermore, identical or similar objects are identified by the same reference symbols in the figures.

DETAILED DESCRIPTION OF EXEMPLARY EMBODIMENTS

Figure 1:
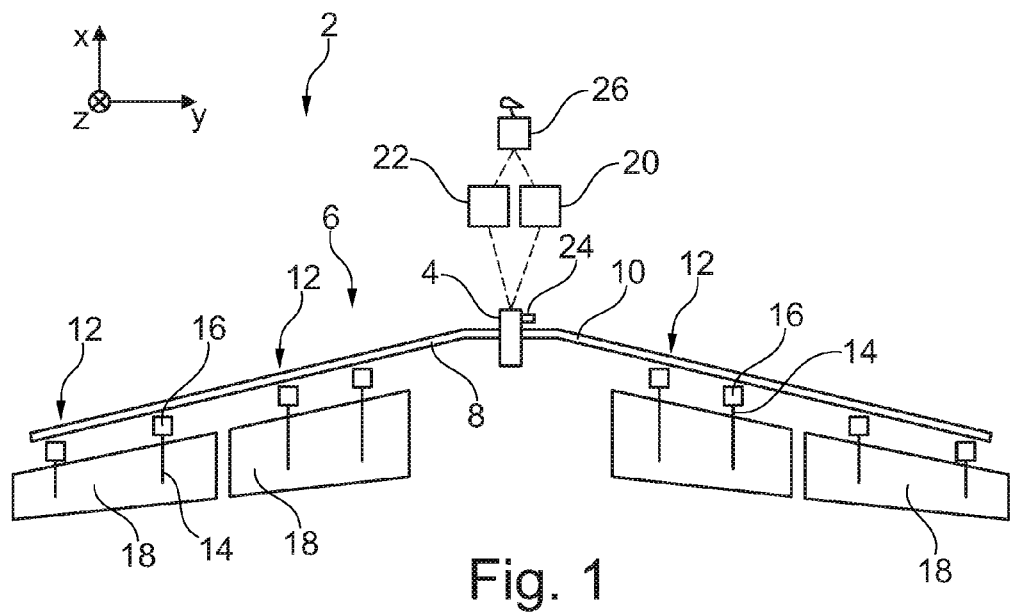
FIG. 1 shows a schematic overview of a high-lift system of an aircraft with a central drive unit.

FIG. 1 shows a basic design of a high-lift system 2. In this case, a central drive unit 4 (PCU) is provided and coupled to a transmission shaft system 6 comprising a left transmission shaft 8 and a right transmission shaft 10. These transmission shafts are coupled to driving stations 12 that are distributed over trailing wing edges along the transmission shafts 8 and 10.

Each driving station 12 comprises a rotary actuator 16 that may be driven by the respective transmission shaft 8, 10 and is coupled to a flap 18 by means of a connecting link 14 that may be realized in the form of a push rod of sorts. For example, each flap 18 may be coupled to two rotary actuators 16. Both driving stations 12 of the flap 18 are spaced apart from one another and preferably assigned to two laterally opposed flap ends. It is common practice to use two redundant flap control units 20 and 22 that are coupled to the drive unit 4.

A drive sensor 24, which is also referred to as feedback position pickoff unit, is connected to the flap control units 20 and 22 and makes it possible to determine an instantaneous rotatory position of the transmission shaft system 6, based on which the position of the flaps 18 may be determined. A flap adjusting lever 26 serves for adjusting the flaps 18 and delivers a corresponding signal to the flap control units 20 and 22, which in turn activate the drive unit 4 in such a way that the rotatory position of the transmission shaft system 6 corresponds to the desired angle commanded by the flap adjusting lever 26.

Figure 2:
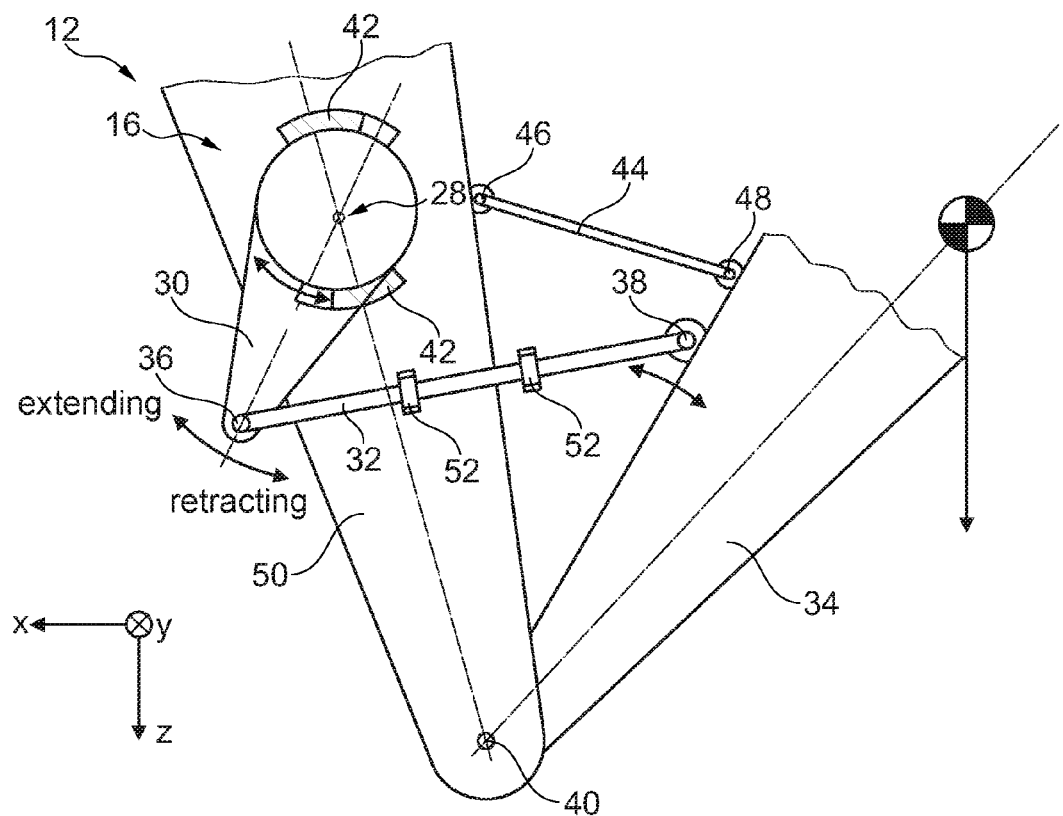
FIG. 2 shows a detailed illustration of a flap mounting, as well as a driving station of the high-lift system according to FIG. 1.

FIG. 2 shows a simplified design of a driving station 12 in the form of a side view. In this case, a rotary actuator 16 moves a drive lever 30 that is mounted rotatably about a lever axis 28 and in turn coupled to a support arm 34 of a flap 18 by means of the connecting link 14. The flap 18 may be directly connected to the support arm 34 rigidly or movably, wherein the leading edge of the flap 18 points toward the left in the plane of projection, i.e. toward the rotary actuator 16. After a corresponding gear reduction, the drive lever 30 is turned about the lever axis 28 by driving the corresponding rotary actuator 16 with the aid of a transmission shaft 8 or 10 at a not-shown gear input of the rotary actuator 16. The connecting link 32 is attached at a mounting point 36 that lies distant from the lever axis 28 and in turn coupled to another mounting point 38 on the support arm 34 of the flap 18. The support arm 34 is mounted on a hinge 40 that is offset in the direction of flight (x-axes), i.e. forward, as well as downward (z-axis). The flap 18 is moved toward or away from the rotary actuator 16 by turning the drive lever 30 accordingly.

An aspect consists of adjusting the length of the connecting link 32 in such a way that play in the kinematic chain of the transmission system and of the rotary actuator is shifted to one side that is subjected to a load while the aircraft is airborne and the play therefore is irrelevant to the flap position while the aircraft is airborne.

Figure 3:
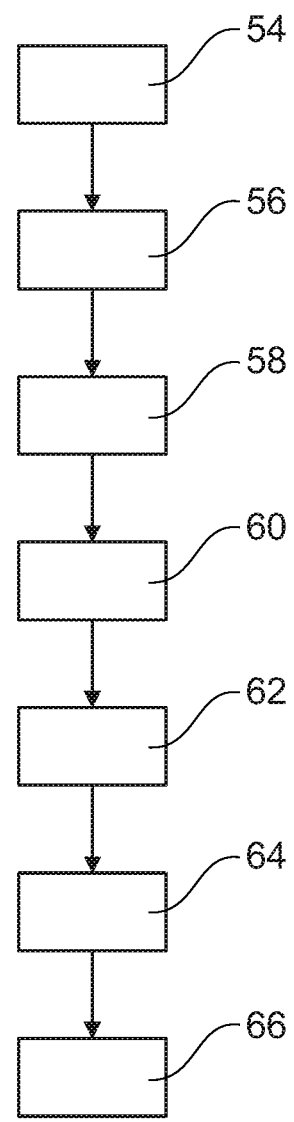
FIG. 3 shows the individual steps of the method in the form of a schematic block-based flowchart.

According to an aspect of the invention, this is achieved with a method illustrated in the form of a block-like flowchart in FIG. 3. This method may initially comprise the displacement 54 of the driving stations 12 into a first position that corresponds, for example, to the "clean" configuration in the cruising mode. Stops 42 are attached 56 to the individual housings of the rotary actuators 16 or a mounting device for mounting the drive levers 30 arranged thereon, wherein the stops 42 are arranged in such a way that the drive lever 30 may be turned no further than a second position before it is blocked by the stop 42. Subsequently, the mechanical connections between the respective transmission shafts 8 and 10 and the driving stations 12 are disengaged 58 in the first position.

In this case, the stops 42 are positioned in such a way that the associated drive lever 30 is moved 60 against the respective stop 42 in the direction of an extended position by driving a gear input of the associated rotary actuator 16. The individual drive levers 30 then come into mechanical contact with the respective stop 42.

After the gear inputs of the rotary actuators 16 have been rotationally fixed 62, the length of the connecting links 32 is adapted 64 in such a way that a position of the associated flap 18 corresponding to the position of the stop 42 is reached. The length of the connecting link 32 is thereby properly adjusted such that the driving stations 12 subsequently may be connected to the associated transmission shaft 8, 10 and all stops 42 may be removed. The mechanical play between the drive unit 4 and the drive lever 30 then lies on the side of the kinematic chain that is subjected to a load while the aircraft is airborne and consequently irrelevant to the precise adjustment of the position of the flaps 18 while the aircraft is airborne.

The adjustment of the length of the connecting links 32 may be simplified by utilizing an adjusting rod 44 that may only be inserted between two structurally fixed points 46 and 48 on a structure 50 carrying the drive lever and on the support arm 34 when the flap 18 is in a predefined position. Such an adjusting rod 44 respectively may only be used for a certain embodiment of the method according to the invention with a predefined fixed second position.

The length of the connecting link 32 may furthermore be adjusted by means of a conventional length adjusting device is indicated in an exemplary fashion with adjusting nuts 52 that may be fixed with lock nuts. However, this depends on the actual construction of the connecting link 32.

As a supplement, it should be noted that "comprising" does not exclude any other elements or steps and that "a" or "an" does not exclude a plurality. It should furthermore be noted that characteristics, which were described with reference to one of the above exemplary embodiments, may also be used in combination with other characteristics of other above-described exemplary embodiments. Reference symbols in the claims should not be interpreted in a restrictive sense.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for adjusting the play in a high-lift system of an aircraft, wherein the high-lift system comprises a drive unit, a driveshaft that is connected to the drive unit and several driving stations that are distributed along and mechanically connected to the driveshaft and respectively comprise a rotary actuator with a housing and a drive lever mounted therein, wherein said drive lever extends radially from a rotational axis of the rotary actuator and is coupled to a pivotably mounted flap by a connecting link, and wherein the respective drive levers are moved by rotating the driveshaft with the aid of the drive unit and the flaps are thereby displaced between a retracted and an extended position, the method comprising:
   displacing the driving stations into a first position;
   disengaging the mechanical connections between the driveshaft and the driving stations in the first position;
   displacing the individual drive levers in the direction of an extended position by mechanically driving a gear input of the associated rotary actuator such that the individual drive levers come into mechanical contact with a stop in a second position, which is spaced apart from the first position in the extending direction;
   rotationally fixing the gear inputs of the rotary actuators;

adapting the length of the connecting links in such a way that a position of the associated flap corresponding to the position of the stop is reached; and reconnecting the driving stations to the driveshaft.

2. The method of claim 1, further comprising the arrangement of removable stops on the individual housings in the second position, and the removal of all stops after adapting the length of the connecting links and producing the connection.

3. The method of claim 1, wherein the stop is an end stop and the second position corresponds to a completely extended position.

4. The method of claim 2, wherein the second position is a 0°-position.

5. The method of claim 1, wherein the displacement of the individual drive levers includes the arrangement of a rotary device with ratchet mechanism on the gear input of the rotary actuator.

6. The method of claim 1, wherein the high-lift system comprises dropped-hinge kinematics.

\* \* \* \* \*